June 29, 1965 F. ROSENBLATT 3,192,505

PATTERN RECOGNIZING APPARATUS

Filed July 14, 1961

INVENTOR.
Frank Rosenblatt
BY
Popp and Sommer
ATTORNEYS 3,192,505
Patented June 29, 1965

3,192,505

PATTERN RECOGNIZING APPARATUS

Frank Rosenblatt, Ithaca, N.Y., assignor to Cornell Aeronautical Laboratory, Inc., Buffalo, N.Y., a corporation of New York Filed July 14, 1961, Ser. No. 124,049
6 Claims. (Cl. 340—146.3)

Figure 1:
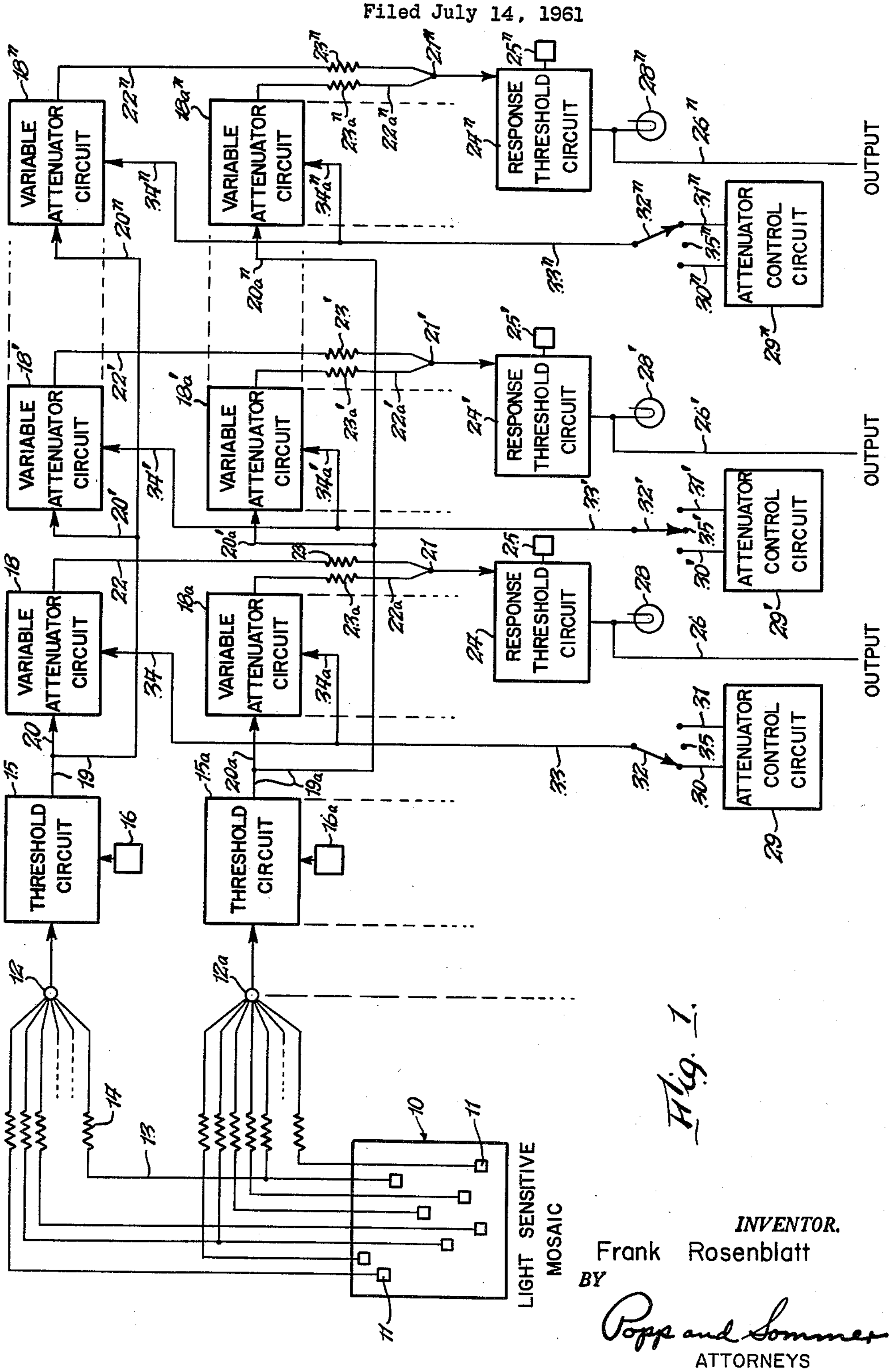

This invention relates to improvements in pattern recognizing apparatus.

The primary object of the present invention is to provide apparatus which discriminates prescribed patterns one from another automatically.

Another object is to provide apparatus which discriminates patterns one from another, even when variations in orientation or in pattern details occur.

Another object is to provide apparatus which discriminates the patterns by activating pre-selected unique output channels when the apparatus is exposed to each of the patterns to be discriminated.

Still another object of the invention is to provide apparatus which discriminates the patterns by a pre-established adaptive training process.

In its preferred embodiment, an object of the present invention is to provide apparatus which discriminates different prescribed spatial light patterns one from another automatically.

In the preferred embodiment of the invention, patterns are discriminated by manifold adding together selected sets of light values from the pattern, determining if each of the manifold sums exceeds a pre-set value so as to become excited, transmitting to response points a specific stored value associated with each excited sum point, and finally activating an output channel if the sum of the stored values transmitted to the corresponding response point exceeds a second pre-set value. The apparatus discriminates the patterns by finding proper stored values, described above, by an adaptive training process. Proper stored values are found by adjusting all stored values associated with excited sum points and to transmit such stored values to response points eliciting undesired outputs for the pattern to which the apparatus is exposed at the moment. During the training process, an outside agency is required to present patterns to the apparatus and impose proper responses as required.

Other objects and advantages of the invention will appear from the following detailed description of a preferred embodiment as illustrated in the accompanying drawing in which:

FIG. 1 is a block diagram of apparatus constructed in accordance with the principles of the present invention.

The apparatus illustrated in FIG. 1 is shown as comprising sensor means such as a light sensitive mosaic 10 upon which the desired prescribed spatial light patterns are imposed by any suitable means (not illustrated). The mosaic 10 is made up of an array of photo-resistor sensor elements 11. The electrical signal outputs of the sensor elements 11, suitably amplified, are conductively connected in random manner to a plurality of signal sum points, two of which are indicated at 12 and 12*a*. The electrical connection between a signal sum point and a photo-resistor element is represented typically by a line or conductor 13 having a summing resistor 14 therein carrying a negative or positive signal. The photo-resistor elements for connection to any signal sum point are arbitrarily chosen.

A plurality of threshold circuit means, such as shown at 15 and 15*a*, are severally operatively associated with the signal sum points 12 and 12*a*, respectively. Each threshold circuit means is adapted to provide a selectively adjustable threshold by threshold setting means indicated at 16 and 16*a* for the circuit means 15 and 15*a*, respectively.

Signal representing sums from the signal sum points 12 and 12*a* are compared in the threshold circuit means 15 and 15*a* with the threshold voltage established by the adjustable threshold means 16 and 16*a*. The threshold circuit means and its adjustment means may be of any suitable construction. For example, the same may comprise a threshold-adjusting potentiometer, a threshold-amplifier transistor and a relay.

The threshold circuit means such as 15 or 15*a* are adapted to produce a voltage output in accordance with the excited or unexcited condition of the signal sum points such as 12 and 12*a*. This voltage is transmitted to a manifold of variable attenuator circuit means, such as indicated at 18, 18' through $18^n$ for the threshold circuit means 15, and at 18*a*, 18*a'* and $18a^n$ for the threshold circuit means 15*a*. The manifold feed line or conductor for the variable attenuator circuit means 18 through $18^n$ is shown at 19 from which branch lines or conductors 20, 20' through $20^n$ extend to the corresponding variable attenuator circuit means. For the other manifold of variable attenuator circuit means 18*a* through $18a^n$ illustrated, the manifold feeder line or conductor is shown at 19*a* and the various branch lines at 20*a*, 20*a'* and $20a^n$.

Each of the variable attenuator circuit means is capable of receiving the voltage transmitted by the associated threshold circuit means and producing a variable attenuator electrical signal output. These outputs are severally connected to a plurality of second or response signal sum points 21, 21', $21^n$ which correspond in number to that of the variable attenuator circuit means in one of the manifolds thereof shown as a horizontal row of such variable attenuator circuit means. More specifically, the signal sum point 21 is conductively connected to the variable attenuator circuit means 18 and 18*a* by lines or conductors 22 and 22*a*, respectively. Summing resistors 23 and 23*a* are in the lines 22 and 22*a*, respectively. Similarly the variable attenuator circuit means 18' and 18*a'* are connected to the response signal sum point 21' by lines or conductors 22' and 22*a'* having summing resistors 23' and 23*a'* therein, respectively. Also, variable attenuator circuit means $18^n$ and $18a^n$ are severally connected to the response signal sum point $21^n$ by lines or conductors $22^n$ and $22a^n$ having summing resistors $23^n$ and $23a^n$ therein, respectively.

The variable attenuator circuit means may be constructed of any suitable components. For example, the same individually may comprise a two-stage complementary emitter amplifier driving a D.C. timing motor which positions two potentiometers.

Operatively associated with each corresponding variable attenuator circuit means in the various manifolds thereof, and hence with the several response signal sum points 21 through $21^n$, are response threshold circuit means indicated at 24, 24' and $24^n$. Operatively associated with each of said response circuit means 24, 24' and $24^n$ are selectively adjustable threshold setting means 25, 25' and $25^n$, respectively.

Severally operatively associated with each of the various response threshold circuit means 24, 24' and $24^n$ are output lines 26, 26' and $26^n$, respectively. Indicator lamps 28, 28' and $28^n$ are connected to the output lines 26, 26' and $26^n$, respectively.

Reviewing the operation of the apparatus so far described, if the voltage sums at the various signal sum points such as 12 exceed the individual associated threshold voltage provided by the threshold circuit means such as 15, a fixed, positive, predetermined voltage is transmitted to the associated variable attenuator circuit means such as 18 and the other such means 18' through $18^n$ manifolded therewith. If the signal sum is lower than the threshold, a fixed negative or zero, predetermined voltage is transmitted to the associated variable attenuator circuit means. The attenuated output from each variable attenuator circuit means is connected through summing resistors such as 23 to one of a plurality of response threshold circuit means such as 24. If the signal sum at a given response threshold circuit means exceeds its arbitrarily pre-selected threshold, a voltage is transmitted to the output line such as 26 and to the associated indicator lamp such as 28. The resultant specific combination of voltage/no-voltage conditions at all output terminals identifies the pattern imposed upon the light sensitive mosaic 10. The resultant specific combination of indicator lamp on/off conditions also identifies the pattern.

Under any arbitrary condition of variable attenuator circuit means, as here involved, an undesirable identification may be emitted for one or more of the patterns which are to be recognized. When this circumstance arises, training or adaptation of the apparatus can result in proper discrimination. For purposes of training the pattern recognizing apparatus, a plurality of selectively operable attenuator control circuit means such as indicated at 29, 29′ and $29^n$ are operatively associated with the corresponding variable attenuator circuit means in each of the manifolds thereof. Thus the attenuator control circuit means 29 is associated with the variable attenuator circuit means 18 and 18*a*, the means 29′ with the means 18′ and 18*a*′, and the means $29^n$ with the means $18^n$ and $18a^n$. Each attenuator control circuit means has a pair of output lines, designated 30 and 31 for the means 29, to provide contacts for a switch 32. The switch 32 is conductively connected to a manifold line or conductor 33 having branches 34 and 34*a* which lead to the variable attenuator circuit means 18 and 18*a*, respectively. An intermediate dead or unconnected contact 35 is shown as arranged between the contacts for the output lines 30 and 31.

Similarly, the attenuator control circuit means 29′ has output lines 30′ and 31′, a switch 32′, an intermediate dead contact 35′ therefor, a manifold line or conductor 33′, and branch lines 34′ and 34*a*′ leading to the respective variable attenuator circuit means 18′ and 18*a*′. In similar fashion, the attenuator control circuit means $29^n$ has a pair of outlet lines or conductors $30^n$ and $31^n$, a switch $32^n$, an intermediate dead contact $35^n$ therefor, a manifold line or conductor $33^n$, and branch lines $34^n$ and $34a^n$ for the variable attenuator circuit means $18^n$ and $18a^n$, respectively.

Each of the attenuator control circuit means such as 29, 29′, $29^n$ generates two outputs, one in the line such as 30, 30′ or $30^n$, and the other in the output line such as 31, 31′, $31^n$. When the corresponding switch 32, 32′ or $32^n$ is connected to the respective output line 30, 30′ or $30^n$ the output in such line causes the associated attenuator circuit means to decrease their attenuation, and when connected to the respective output line 31, 31′ or $31^n$ the output in such line causes the associated attenuator circuit means to increase their attenuation. The control switches 32, 32′ and $32^n$ are selectively operated.

If, when the apparatus is stimulated with a given pattern, the response emitted by any response threshold circuit means such as 24, 24′ or $24^n$ is incorrect, the corresponding control switch such as 32, 32′ or $32^n$ is operated to bring about a change in the associated variable attenuator circuit means. For example, if an individual indicator lamp such as 28, 28′ or $28^n$ is lit in response to a given pattern and it should not be lit, then the associated control switch 32, 32′ or $32^n$ is thrown to a position wherein it contacts the corresponding output line 31, 31′ or $31^n$, such position being indicated specifically for switch $32^n$, thereby sending signals to all associated attenuator circuit means which would cause them to increase their attenuations. On the other hand, if an individual indicator lamp is not lit in response to a given pattern and it should be lit, then the associated control switch is thrown to a position such as represented by the position of the switch 32, sending signals to all associated variable attenuator circuit means which would cause them to decrease their attenuations. If an individual indicator lamp is either properly lit or not, no control signal need be sent to the associated vairable attenuator circuit means and this is represented by the position of the switch 32′ which engages the dead contact 35′.

It is to be understood clearly that the many variable attenuator circuit means change attenuation in response to signals from the attenuator control circuit means, such as 29, 29′ and $29^n$, only if the associated threshold circuit means 15 or 15*a* is transmitting its fixed, positive, predetermined voltage. Thus, as shown, each photo-resistor element is electrically conductively connected to some one of the signal sum points, but less than all of such elements are connected to a given one of such signal sum points, and what particular ones of such elements of the entire mosaic thereof are associated with a particular sum point results from random or arbitrary selection.

Any number of sets or strings of associated signal sum point means, threshold circuit means and manifolded variable attenuator circuit means, may be employed. Also, any number of variable attenuator circuit means may be manifolded together in a given one of such sets or strings.

The circuits represented diagrammatically for each of the various stages of the apparatus illustrated are conventional in character and well known in the art and equivalent circuits will occur to those skilled in the art and may be selected as desired to meet any particular set of operating conditions encountered in practicing the invention. The scope of the invention is to be measured by the appended claims.

What is claimed is:

1. In pattern recognizing apparatus, the combination comprising sensor means including elements severally adapted to produce sensor electrical signal outputs when stimulated by a pattern, a plurality of first signal sum points, means conductively connecting said sensor electrical signal outputs to said first signal sum points, so that each of said elements is associated with some one of said first signal sum points but less than all of said elements are associated with a given one of said first signal sum points; a plurality of first threshold circuit means severally operatively associated with said first signal sum points and arranged to compare signal sums from said first signal sum points with a predetermined threshold and operative to transmit a predetermined voltage when the signal sum from the corresponding one of said signal sum points is higher than the associated threshold, a manifold of variable attenuator circuit means operatively associated with each of said first threshold circuit means and arranged to receive said predetermined voltage transmitted thereby and to transmit a variable attenuator electrical signal output, a plurality of second signal sum points corresponding in number to that of variable attenuator circuit means in one of said manifolds thereof, means conductively connecting the variable attenuator electrical signal outputs of one variable attenuator circuit means of each of said manifolds with the corresponding one of said second signal sum points, a plurality of second threshold circuit means severally operatively associated with said second signal sum points and arranged to compare signal sums from said second signal sum points with a predetermined threshold and each operative to transmit an output voltage, and a plurality of selectively operable attenuator control circuit means operatively associated with said variable attenuator circuit means to alter the attenuation thereof.

2. Pattern recognizing apparatus according to claim 1 wherein said elements of said sensor means are light sensitive and arranged as a mosaic.

3. Pattern recognizing aparatus according to claim 1 wherein each of said connecting means includes summing resistors.

4. Pattern recognizing apparatus according to claim 1 wherein each of said threshold circuit means is adjustable to provide a variable threshold.

5. Pattern recognizing apparatus according to claim 1 wherein each output voltage associated with said second threshold circuit means is transmitted to an indicator lamp.

6. Pattern recognizing apparatus according to claim 1 wherein each of said attenuator control circuit means includes switch means and means for generating two outputs one of which causes a variable attenuator circuit means to decrease its attenuation and the other of which causes a variable attenuator circuit means to increase its attenuation.

References Cited by the Examiner

UNITED STATES PATENTS

| | | | |
|---|---|---|---|
| 2,943,208 | 6/60 | Shepard et al. | 340—146.3 |
| 2,924,812 | 2/60 | Merritt et al. | 340—146.3 |
| 3,000,000 | 9/61 | Eldredge | 340—146.3 |

MALCOLM A. MORRISON, *Primary Examiner.*